(12) United States Patent
Tsingos et al.

(10) Patent No.: US 8,958,567 B2
(45) Date of Patent: Feb. 17, 2015

(54) METHOD AND SYSTEM FOR SPLIT CLIENT-SERVER REVERBERATION PROCESSING

(75) Inventors: Nicolas R. Tsingos, Palo Alto, CA (US); Micah Taylor, Pittsboro, NC (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 420 days.

(21) Appl. No.: 13/489,300

(22) Filed: Jun. 5, 2012

(65) Prior Publication Data

US 2013/0010975 A1 Jan. 10, 2013

Related U.S. Application Data (60) Provisional application No. 61/505,169, filed on Jul. 7, 2011.

(51) Int. Cl.
*H03G 3/00* (2006.01)
*G10L 21/02* (2013.01)
*H04R 5/02* (2006.01)
*G06F 17/00* (2006.01)

(52) U.S. Cl.
CPC .................................. *G10L 21/0202* (2013.01)
USPC ................................ 381/63; 381/310; 700/94

(58) Field of Classification Search
CPC ................... G10H 2210/281; G10H 2210/291
USPC ............. 381/63, 17, 312, 310, 2, 306, 77, 80; 700/94; 709/203
See application file for complete search history.

(56) References Cited

U.S. PATENT DOCUMENTS

| | | |
|---|---|---|
| 7,006,616 B1 | 2/2006 | Christofferson |
| 7,090,582 B2 | 8/2006 | Danieli |
| 7,439,873 B2 | 10/2008 | Tillotson |
| 7,533,346 B2 | 5/2009 | McGrath |
| 7,599,501 B2 | 10/2009 | Sferrazza |
| 7,606,375 B2 | 10/2009 | Bailey |

(Continued)

FOREIGN PATENT DOCUMENTS

| | | |
|---|---|---|
| JP | 2006-094315 | 4/2006 |
| JP | 2006-279588 | 10/2006 |
| WO | 2008125593 | 10/2008 |

OTHER PUBLICATIONS

"Pre-computing geometry-based reverberation effects for games", Nicolas Tsingos, Filed by applicant on Sep. 25, 2012.*

(Continued)

*Primary Examiner* — Vivian Chin
*Assistant Examiner* — Ammar Hamid (57) ABSTRACT

In some embodiments, a method applying reverberation to audio from at least one client of a set of clients which share a virtual environment, including by asserting position data and at least one input audio stream to a server, selecting (in the server) a reverberation filter for each input audio stream in response to the position data and generating wet audio by applying to the input audio an early reverberation part of the selected reverberation filter. Typically, a client applies a late reverberation filter to the wet audio using metadata from the server. In other embodiments, a server selects a reverberation filter for application to audio in response to position data, asserts the audio and metadata indicative of the filter, and a client applies the filter to the audio using the metadata. Other aspects are systems, servers, and client devices configured to perform any embodiment of the method.

36 Claims, 4 Drawing Sheets

(56) References Cited

U.S. PATENT DOCUMENTS

| | | | |
|---|---|---|---|
| 7,724,885 | B2 | 5/2010 | Jarske |
| 7,876,903 | B2 | 1/2011 | Sauk |
| 2004/0263636 | A1 | 12/2004 | Cutler |
| 2007/0168359 | A1 | 7/2007 | Jacob |
| 2008/0004729 | A1 | 1/2008 | Hiipakka |
| 2008/0144794 | A1 | 6/2008 | Gardner |
| 2008/0294721 | A1 | 11/2008 | Berndt |
| 2009/0282335 | A1 | 11/2009 | Alexandersson |
| 2010/0195812 | A1 | 8/2010 | Florencio |
| 2011/0026745 | A1 | 2/2011 | Said |
| 2014/0016793 | A1* | 1/2014 | Gardner .......................... 381/63 |

OTHER PUBLICATIONS

"Comparison of Delivery Architectures for Immersive Audio in Crowded Networked Games", Paul Boustead and Farzad Safaei, filed by applicant on Sep. 25, 2012.*

Wadley, G., et al., "Speaking in Character: Using Voice-Over-IP to Communicate within mmorpgs", in IE 2007, Proceedings of the 4th Australasian Conference on Interactive Entertainment, Melbourne, Australia 2007, pp. 1-8, RMIT University.

Salin, Eva-Lotta, "Effects of Communication Mode on Social Presence, Virtual Presence, and Performance in Collaborative Virtual Environments", Presence: Teleoper. Virtual Environ. vol. 14, No. 4, pp. 434-449, 2005.

Williams, D., et al., "Can you Hear Me Now? The Impact of Voice in an Online Gaming Community" Human Communication Research, No. 4, pp. 427-449, 2007.

Begault, Durand R., 3D Sound for Virtual Reality and Multimedia, Academic Press Professional, 1994.

West, J.E., et al., "Teleconferencing System Using Head-Related Signals" Applied Acoustics, vol. 36, No. 3-4, pp. 327-333, 1992.

Hollier, M.P., et al., "Spatial Audio Technology for Telepresence", BT Technology Journal, vol. 15, No. 4, pp. 33-41, 1997.

Greenhaigh, C., et al., "Massive: A Collaborative Virtual Environment for Teleconferencing", ACM Trans. Comput-Hum. Interact., vol. 2, No. 3, pp. 239-261, 1995.

Radenkovic, M., et al., "Deployment Issues for Multi-User Audio Support in CVES", in VRST 2002: Proceedings of the ACM Symposium on Virtual Reality Software and Technology, New York, 2002, pp. 179-185, ACM.

Boustead, P., et al., "Comparison of Delivery Architectures for Immersive Audio in Crowded Networked Games" in NOSSDAV 2004: Proceedings of the 14th International Workshop on Network and operating systems, support for Digitial Audio and Video, New York, USA.

Boustead, P., et al., "DICE: Internet Delivery of Immersive Voice Communication for Crowded Virtual Spaces", in Virtual Reality, 2005. Proceedings, VR 2005, IEEE, Mar. 2005, pp. 35-41.

N. Tsingos, "Precomputing Geometry-based Reverberation Effects for Games" AES 35th conf on Audio for games, 2009.

Funkhouser, T., et al., "Real-time Acoustic Modeling for Distributed Virtual Environments" in SIGGRAPH 1999: Proceedings of the 26th annual Conference on Computer Graphics and Interactive Techniques, pp. 365-374, New York, USA 1999.

Taylor, M., et al., I-Sound: Interactive GPU-based Sound Auralization in Dynamic Scenes. Tech Report; published in 2010.

Soulodre, G.A., "About this Dereverberation business: A Method for Extracting Reverberation from Audio Signals" AES 129th Convention, San Francisco, CA 2010.

Merimaa, J., et al., "Spatial Impulse Response Rendering" Proc. of the 7th Intl. Conf. on Digital Audio Effects, Naples, Italy, Oct. 2004.

Jot, Jean-Marc, "Real-time Spatial Processing of Sounds for Music, Multimedia and Interactive Human-Computer Interfaces" Multimedia Systems, 7(1) 55-69, 1999.

Nguyen, C.D., et al., "Optimal Assignment of Distributed Servers to Virtual Partitions for the Provision of Immersive Voice Communication in Massively Multiplayer Games" Computer Communications, vol. 29, Issue 9, May 31, 2006, pp. 1260-1270.

Que, Y.P., et al., "An Immersive Voice Over IP Service to Wireless Gaming: User Study and Impact of Virtual World Mobility" published in 2007, proceedings of the 6th ACM SIGCOMM workshop on Network and System Support for games, pp. 93-98.

Krebs, Eric M., "An Audio Architecture Integrating Sound and Live Voice for Virtual Environments" Master Thesis on Sep. 2002.

Que, Y.P., et al. "The Impact of Avatar Mobility on Distributed Server Assignment for Delivering Mobile Immersive Communication Environment" IEEE International Conference on Communications 2007.

Low, C., et al. "Distributed 3D Audio Rendering" Internet Communications Services HP laboratories, Jan. 1998.

Rothbucher, M., et al. "Integrating a HRTF-Based Sound Synthesis System into Mumble" 2010 IEEE 12th International Workshop on Multimedia Signal Processing, Conference date: Oct. 4-6, 2010.

Que, Y.P., et al. "Distributed Server Delivery of Immersive VoIP Service: Balancing Between Voice Latency and Access Upload Cost" 2007 15th IEEE International Conference on Networks, pp. 489-494.

Que, Y.P. et al., "Scalable Delivery of Immersive Communication Environment (ICE) Using Peer-to-Peer (P2P) Architecture", IEEE Globecome 2006, conference in Nov. and Dec. 2006.

Nguyen, C.D. et al., "On the Provision of Immersive Audio Communication to Massively Multi-Player Online Games" Proceedings, ISCC 2004, Ninth International Symposium on Computers and Communications, pp. 1000-1005, vol. 2, conference date: Jun. 28-Jul. 1, 2004.

Seo, B. et al., "An Embedded P2P-Based Positional Audio System in Virtual Environments" 2010 IEEE International Conference on Multimedia and Expo, ICME 2010.

Anderson, D.B. et al., "The Sound Dimension" IEEE Spectrum, Mar. 1997.

* cited by examiner

METHOD AND SYSTEM FOR SPLIT CLIENT-SERVER REVERBERATION PROCESSING

CROSS REFERENCE TO RELATED APPLICATIONS

This application claims the benefit of priority to related, Provisional U.S. Patent Application No. 61/505,169 filed on 7 Jul. 2011 entitled "Method and System for Split Client-Server Reverberation Processing" by Nicolas Tsingos, et al. hereby incorporated by reference in its entirety.

BACKGROUND OF THE INVENTION

1. Field of the Invention

The invention relates to systems and methods for applying reverberation to audio with selection by a server of at least one reverberation filter for application to the audio (e.g., at least one input audio stream asserted to the server from at least one client device) and application of at least one selected filter to the audio by a client device (or by the server and the client device). Typical embodiments are systems and methods which implement a voice-over internet protocol (VoIP), in which audio asserted to the server from each client device is indicative of speech by an audio source in a virtual environment (e.g., a multi-player game environment) shared by all the client devices.

2. Background of the Invention

Throughout this disclosure, including in the claims, the expression performing an operation "on" signals or data (e.g., filtering, scaling, or transforming the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression "system" is used in a broad sense to denote a device, system, or subsystem. For example, a subsystem that implements audio signal processing may be referred to as an audio processing system, and a system including such a subsystem (e.g., a system that generates X output signals in response to audio signals and non-audio signals, in which the subsystem generates the audio signals and the non-audio signals are received from an external source) may also be referred to as an audio processing system.

For networked virtual environments, such as social communities or massively multiplayer on-line (MMO) games, meaningful interaction through voice conversation with real people can be a valuable feature. First adopted through side-clients enabling telephone quality, walkie-talkie style communication, voice services are becoming more integrated and are now connecting hundreds of millions of users on PCs, game consoles and cell phones. In the next few years, voice communications through social or gaming environments will represent a significant portion of the total voice minutes. The goal of immersive voice is to make the audio component seamless and transparent to the technology, creating an immediate feeling of connectedness or presence in the user. Research suggests effective immersive voice is a function of both the voice fidelity, as well as the plausibility, consistency and perceptual level of engagement of the user.

Historically, immersive voice has been primarily associated with some form of spatial audio capture and reproduction. Spatialized voice communication has been extensively explored in the context of teleconferencing applications with a limited number of clients or endpoints, starting with early Bell Laboratories experiments of stereophonic telephony in 1930. In the 1990s, several experiments were conducted relying on multi-channel or binaural acquisition and rendering. Initially, voice in games and other virtual environments was typically mono and functioned much like a traditional conference-call for members of a particular team. Early research efforts to build immersive communication environments include the Massive system which built a 3D virtual environment with voice for teleconferencing. Building upon previous work in voice-over internet protocol (VoIP) and immersive teleconferencing and taking advantage of advances in commodity computer and audio hardware, integrated voice services quickly evolved to offer high-quality spatialized voice.

Contrary to traditional teleconferencing applications involving a relatively low number of participants, recent networked applications require serving hundreds to thousands of clients in a single virtual world. Typical massively multi-player online (MMO) games can support over 5000 players in one virtual world. In successful games there can be many parallel copies of the virtual worlds leading to millions of people playing simultaneously. The players can be spread over large real-world distances. The worlds themselves can have very dense voice scenes with hundreds of people within visual range in popular parts of the map. In order to provide immersive voice in these environments in a scalable and cost effective manner it is important to consider the delivery costs such as bandwidth and the number of servers required and how they scale to the number of people in the environment. In order to keep server costs down it is important to support thousands of players on each physical server. It is also important to ensure that bandwidth costs are kept low even in very crowded scenes.

As a result, scalable VoIP servers generally implement a combination of voice packet forwarding as well as mixing of the voice streams on the server. In mixing mode, the server creates a simplified representation of the voice scene audible to each client by grouping different voice streams together to create clusters. The audio mixture corresponding to all the voice streams grouped in a cluster is computed on the server and streamed back to the client. In general the number of clusters is significantly lower than the number of connected clients therefore limiting the required bandwidth.

If the number of active talkers is small, the voice streams can be directly forwarded to each client, in which case any further processing must be carried out client-side.

Modeling the effects of distance, occlusion and reverberation on the voice signals is of primary importance in environments where participants can communicate realistically from multiple areas or rooms. The most advanced VoIP systems currently implement direct line-of-sight occlusion modeling as well as simplified diffraction effects resulting in unrealistic proximity cues. For MMO games where localizing teammates and enemies is of primary importance, rendering inappropriate distance cues can lead to a tactical disadvantage. Due to the high computing cost and the difficulty to combine reverberation processing with clustering or spatial scene simplification, none of the previous work so far was able to render convincing early sound scattering and reverberation effects capable of conveying realistic proximity cues for large numbers of participants.

Sound reverberation effects due to sound scattering off wall surfaces carry major cues related to the size of the environment and distance to sound sources. Therefore, reverberation helps users to establish a better sense of presence in virtual environments and is arguably one of the most important audio effects to simulate in virtual environment applications supporting VoIP communication.

Client-server solutions have been proposed for dynamically computing sound propagation paths between clients connected in a virtual environment, but they have been limited to applications with very few concurrent clients and cannot scale to massive environments.

In current video games, reverberation effects are either directly pre-rendered into the sound effects or implemented at run-time using dynamic artificial reverberation filters. Parameters of the reverberation decay can be directly manipulated by the sound designer to achieve a desired effect without requiring any geometrical modeling.

While simplifying the authoring process, traditional artificial reverberators suffer from a number of issues. They impose a "single room" model and constrain the shape of the decay profile (e.g., exponential). They make limited use of geometry and therefore fail to convincingly model coupled or outdoor spaces or provide finer-grain surface proximity effects. Finally, they do not scale to accommodate large numbers of concurrent effects. Recently a number of geometrical approaches have been presented to model dynamic sound reflection and diffraction interactively.

A practical approach to simulating acoustics of a virtual environment is to precompute the acoustical response at several locations throughout the environment in an off-line process so that the results can be efficiently re-used to process audio signals at run-time (e.g., during game play). A main benefit of such off-line computation is that high-order scattering (reflection/diffraction) can be simulated, providing improved proximity cues and distance perception. The acoustical response of an environment can be represented by a set of predetermined reverberation filters which can be stored, for later use (e.g., during game play) to process a dry signal in order to impart a reverberant characteristic to the dry signal. A method for generating such a set of reverberation filters is described in the paper by Nicolas Tsingos, entitled "Pre-Computing Geometry-Based Reverberation Effects for Games," AES 35$^{th}$ International Conference on Audio for Games, 2009 ("Tsingos").

As described in Tsingos, to implement such an off-line computation the acoustical response of the virtual environment can be determined (sampled) for pairs of key locations in the environment, each key location acting in turn as a source location or a listener location. At run-time the current locations of each desired source and listener pair are then used to access the closest pre-sampled pair of key locations, and the desired acoustical response associated with the closest sampled pair is returned. To properly sample discontinuities created by wall boundaries, the environment can be partitioned into zones, the acoustical response of each zone can be determined (sampled) for pairs of key locations in the zone, and a predetermined acoustical response associated with a sampled pair of key locations (closest to the locations of the desired source and listener) in a zone is returned only for desired sources and listeners located in that zone.

The early reflections present in reverberation filters (which simulate a virtual environment's effect on emitted sound) generally vary significantly depending on the considered pairs of source and listening points. In contrast, the later parts of such reverberation filters are generally more consistent throughout the environment. For this reason, it is customary in architectural acoustics to separate the early part and late part of the reverberation determined by a reverberation filter.

Figure 1:
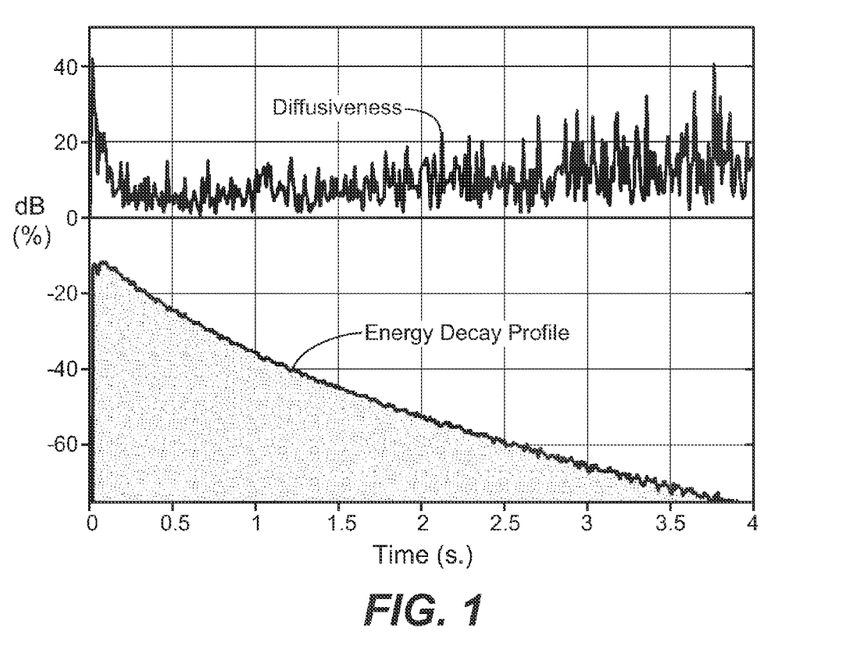
FIG. 1 is a set of two graphs. The lower graph represents the energy decay profile (in one frequency sub-band) of an exemplary reverberation filter. The upper graph represents the filter's diffusiveness index (a ratio of directional-to-diffuse energy) as a function of time.

A typical, compact representation of a reverberation filter (which simulates a virtual environment's effect on emitted sound) is its energy decay profile through time (e.g., as determined by integrating the energy of an acoustic signal emitted from a source in the environment as a function of its arrival time at a listener, and quantizing the energy values into a number of decay blocks (each decay block corresponding to a different arrival time range) at the desired sampling rate as described in Tsingos). For example, the lower graph in FIG. 1 represents the energy decay profile (in one frequency subband) of an exemplary reverberation filter of this type. If diffuse energy exchanges are modeled, the energy of each diffuse ray can also be directly integrated into the profile during the ray-tracing step. Additional parameters (e.g., a ratio of directional-to-diffuse energy as well as principal direction of incidence at the listener for reflected sound) can also determine or characterize a reverberation filter which simulates a virtual environment's effect on emitted sound. For example, the upper graph in FIG. 1 represents a diffusiveness index (a ratio of directional-to-diffuse energy) as a function of time, of the filter whose energy decay profile is shown in the lower graph of FIG. 1.

Stored data that determine a reverberation filter (for a source listener pair in a virtual environment) can be of several different types. For example, a decay block structure including attenuation values (e.g., in dBs) for different frequencies can be stored to model the filter's time-frequency envelope (e.g., an attenuation value is stored for each of a predetermined number of frequency bands, for each time window of the filter). As described in Tsingos, one can also compute and include in the stored decay block structure a principal direction and a diffusiveness index indicative of the ratio of directional-to-diffuse energy (e.g., 1 is pure directional, 0 is pure diffuse) for each time window of the filter (e.g., a diffusiveness index data determining the upper graph of FIG. 1).

Figure 2:
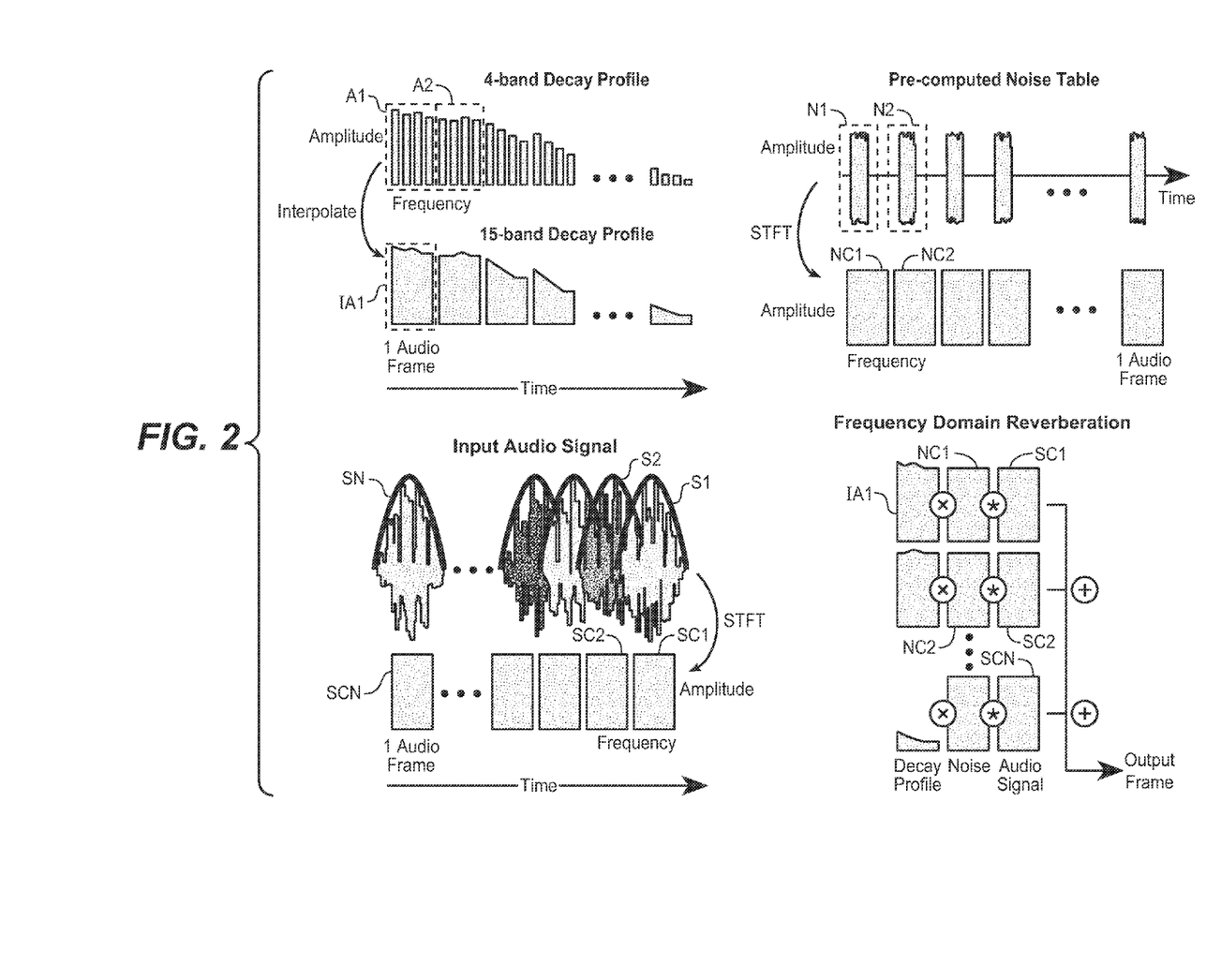
FIG. 2 is a set of diagrams of an exemplary processing pipeline for implementing a reverberation filter (which simulates a virtual environment's effect on emitted sound) and applying the filter to an input audio signal.

FIG. 2 illustrates an exemplary processing pipeline (described in the above-cited Tsingos paper) for implementing a reverberation filter which simulates a virtual environment's effect on emitted sound, and applying the filter to an input signal.

The "4-band Decay Profile" identified in FIG. 2 represents a set of four attenuation values (each for a different frequency band) of the filter's time-frequency envelope, for each time window of the filter. For example, values A1 in FIG. 2 are the four attenuation values for the first time window (corresponding to the earliest reverb), and values A2 in FIG. 2 are the four attenuation values for the second time window. The relatively small set of values comprising the 4-band Decay Profile can be stored. In order to apply the filter to an input audio signal, the stored values can be read from storage, and interpolation can then be performed on the filter attenuation values for each time window to generate the "15-band Decay Profile" for the filter. The 15-band Decay Profile comprises fifteen interpolated attenuation values (one for each of the fifteen frequency sub-bands of a fifteen-band partition of the frequency domain) per time window. For example, the four values A1 in FIG. 2 for the first time window are interpolated to generate fifteen interpolated values IA1 for the first time window. In alternative implementations, the decay profile has more than (or less than) four bands, and/or the decay profile (having N bands) is upsampled to more than or less than fifteen bands (e.g., a four-band profile for each time window is upsampled to more than fifteen bands). Typically the number of subbands used during the reverberation processing will depend on how many are imposed by the codec that is used to transmit the voice data (since most codecs use a subband/filter-bank structure to encode the audio).

The fine grain temporal structure of the reverberation impulse response is modeled as noise (e.g., white noise). Thus, for each time window of the filter, the fine grain temporal structure of the filter is a burst of precomputed noise attenuated by the attenuation value (of the filter's time-frequency envelope) for the time window. For example, values N1 in FIG. 2 are the noise for the first time window (corresponding to the earliest reverb), and values N2 in FIG. 2 are the noise for the second time window. A short time Fourier transform (STFT) or another time-to-frequency-domain transform (e.g., the Modified Discrete Cosine Transform or "MDCT") is applied to the noise for each time window, to generate noise frequency coefficients for each time window. For example, values NC1 in FIG. 2 are the noise frequency coefficients for the first time window and values NC2 in FIG. 2 are the noise frequency coefficients for the second time window.

The input audio signal (typically a speech signal) to be filtered by the attenuation filter consists of audio data frames, each corresponding to a different time window of the input audio signal. For example, values S1 in FIG. 2 are the input audio data frame for a first time window, values S2 in FIG. 2 are the input audio data frame for a second time window (the time window prior to the first time window), and values SN in FIG. 2 are the input audio data frame for the Nth time window (which occurs "N−1" time windows before the first time window). A short time Fourier transform (STFT) or other time-to-frequency-domain transform is applied to each frame of input audio data, to generate input frequency coefficients for each time window. For example, values SC1 in FIG. 2 are a first frame of input frequency coefficients (for the first time window) and values SC2 in FIG. 2 are a second frame of input frequency coefficients (for the second time window).

At run-time, a dry audio signal is processed (convolved) with a pre-computed reverberation filter to produce a reverberant ("wet") signal that conveys the acoustics of the simulated space. To determine the reverberation filter (by convolution in the frequency domain), the coefficients of each block of noise frequency coefficients are multiplied (e.g., complex multiplied) with the corresponding attenuation values of the corresponding block of filter attenuation values (e.g., coefficients of block NC1 of noise frequency coefficients are multiplied with filter attenuation values IA1 of FIG. 2). To apply the reverberation filter to the input audio signal (by convolution in the frequency domain), the values that determine each time window of the reverberation filter are multiplied with corresponding frequency components of the input audio signal (in the same time window). More specifically, for each frame of input audio data (starting with the "N"th frame of the input audio signal), the reverberation filter is applied to the frame and to each of the N−1 previous frames (each having a different delay time relative to the frame). For each frame of input (dry) audio data (starting with the "N"th frame of the input audio signal), the frequency components of the input audio data frame (and of the N−1 previous frames) are multiplied with the corresponding values (for the relevant time window) of the reverberation filter, and products are summed (over all time windows) to generate a frame of output (wet) audio data (the "output frame" indicated in the diagram labeled "Frequency-domain reverberation" in FIG. 2). In the Frequency-domain reverberation diagram of FIG. 2, the input audio signal frame labeled "SC1" is the Nth frame of input frequency coefficients (e.g., values SC1 of FIG. 2), the input audio signal frame labeled "SC2" is the "N−1"th frame of input frequency coefficients (e.g., values SC2 of FIG. 2, delayed by one delay time, t), and the input audio signal frame labeled "SCN" is the previous frame of input frequency coefficients (e.g., values SCN of FIG. 2, delayed by delay time (N−1)t).

In various embodiments of the invention, application of a reverberation filter to an audio signal (by a client and/or a server) is performed in the frequency domain (as in the FIG. 2 example) or in the time domain, or hybrid time-frequency domain reverberation filtering is performed.

The inventors have recognized three main issues to be addressed in order to provide reverberation processing for massively multi-participant VoIP systems.

First, voice conferencing servers for massive environments generally mix or pass-through the voice streams from clients based on voice-activity and local spatial density of the clients. As a result, the reverberation processing can be alternatively performed on the server (when the server is mixing) or on the client (when the server is forwarding). When mixing, the server typically also performs some form of spatial simplification of the voice scene for each client by grouping neighboring sources into clusters. Choosing an appropriate reverberation for a group of sources is thus a key issue in this context.

Second, given the prohibitive cost of reverberation processing it is desirable to split the required processing between the client and server. Configuring the server to provide reverb indicative of a specific early scattering for each pair of connected clients on the server will provide better proximity cues and distance impressions. Providing the complementary late part of the reverberation processing on the client will provide improved impression of the virtual acoustical space. Since late reverberation varies more smoothly (than early reverberation) across a typical virtual environment, the same late reverberation processing can be used for groups of nearby sources. A challenge is to adapt the processing to varying clusters (of voice streams, or other sound streams, from multiple sources) and provide the required information to the client so that early and late reverberation can be appropriately recombined. The server must pass on to the client the information about which reverberation filter to use for each cluster as well as provide information that the client can use to reconstruct the dry signal (in the mixing case) so as to apply the late part of the reverberation.

Third, bandwidth cost is a primary constraint. As a result, the information required for reverberation processing on the client must be provided with minimal bandwidth requirements.

BRIEF DESCRIPTION OF THE INVENTION

In a first class of embodiments, the invention is a method for applying reverberation to audio from at least one client of a set of clients which share a virtual environment, said method including steps of:

(a) asserting position data and at least one input audio stream to a server, wherein each said input audio stream is indicative of audio from a different one of the clients, the position data is indicative of a listener position and at least one source position in the virtual environment, and each said source position is a position in the virtual environment of a source of one said input audio stream;

(b) in response to the position data, operating the server to select a reverberation filter for each said input audio stream; and (c) generating a wet audio stream for each said input audio stream, by operating the server to apply to the input audio stream an early reverberation part of the reverberation filter selected for said input audio stream.

Typically, each input audio stream corresponds to a source at a different source position in the virtual environment, and step (b) includes a step of selecting the reverberation filter for each input audio stream from a set of predetermined filters (each of the predetermined filters corresponding to a different pair of predetermined source and listener positions), such that the predetermined source and listener positions for the selected filter are a best match to the source position corresponding to the input audio stream and the listener position indicated by the position data. Typically, the listener position is indicative of position in the environment of a user of a first one of the clients, and each input audio stream is indicative of voice data (speech data) from a different one of the clients (e.g., speech data indicative of speech uttered by a user of the relevant one of the clients). In the case that the listener position is indicative of position in the environment of a user of a first one of the clients, two or more input audio streams are asserted to the server in step (a), and two or more wet audio streams are generated in step (c), the method typically also includes steps of mixing the wet audio streams to generate wet mixed audio data, and asserting the wet mixed audio data (e.g., as a stream of cluster packets indicative of the wet mixed audio data) to the first one of the clients. Typically, the server and the clients implement a voice-over internet protocol (VoIP), in which each input audio stream asserted to the server is indicative of speech by an audio source in a virtual environment (e.g., a multi-player game environment) shared by all the clients. Another aspect of the invention is a system including at least two clients and a server configured to implement a method in the first class of embodiments.

Typical embodiments of the invention enable the processing of voice streams in a voice-over internet protocol (VoIP) application so as to render the acoustics of a virtual environment in which users are connected, by applying reverberation to audio signals (produced by the users) so as to simulate the virtual environment's effect on the signals. Typical embodiments perform split (distributed) client and server-side processing in which early reflection reverberation effects are rendered on a server (i.e., the server applies an early reverberation filter) while the late part of the reverberation is rendered on a client (i.e., the client applies a late reverberation filter). In typical embodiments, each reverberation filter applied to audio is selected by the server from a set of predetermined filters (e.g., each of the predetermined filters having been determined by an off-line process) in response to position data indicative of positions of a listener and a group of sources (said group comprising one or more audio sources) in a virtual environment.

In a second class of embodiments, an audio server (e.g., a voice server) is configured in accordance with the invention to perform a method including the steps of:

(a) for a listener and a group of sources (said group comprising one or more audio sources) in a virtual environment, selecting at least one reverberation filter (e.g., from a set of predetermined reverberation filters) in response to position data indicative of positions in the virtual environment of the listener and each source in the group; and (b) asserting metadata (e.g., "reverberation data" as defined herein) to a client, where the metadata is sufficient to enable the client to apply to audio a reverberation filter determined by at least one said reverberation filter selected in step (a).

In some such embodiments, the metadata is sufficient to enable a first client to apply the selected reverberation filter to input audio from a second client (e.g., to input audio which is indicative of an utterance of a source in the group), and step (b) includes a step of asserting the input audio (which may be dry speech data) and the metadata to the first client. Typically, the input audio is dry speech data.

In typical embodiments in the second class, the group of sources includes at least two audio sources, and step (a) includes a step of selecting at least two reverberation filters (each for a different one of the audio sources). Typically, the method also includes a step of generating wet mixed audio by: applying a first early reverberation filter (an early reverberation part of a first one of the selected reverberation filters) to input audio from a first client (e.g., to input audio, from a first client, indicative of an utterance of one of the sources in the group) to generate first wet audio; applying a second early reverberation filter (an early reverberation part of a second one of the selected reverberation filters) to input audio from a second client (e.g., to input audio, from a second client, indicative of an utterance of another one of the sources in the group) to generate second wet audio; and mixing the first wet audio and the second wet audio. In this case, the metadata is sufficient to enable a third client to apply a late reverberation filter (e.g., a late reverberation part of one of the selected reverberation filters, or a late reverberation part of a reverberation filter determined from the selected reverberation filters) to the wet mixed audio, and step (b) includes a step of asserting the wet mixed audio (which may be or include wet mixed speech data) and the metadata to the third client. In this case, the third client is preferably configured to reconstruct an approximation of a dry version of the wet mixed audio and to apply the late reverberation filter to the reconstructed dry version of the wet audio.

Alternatively, the group of sources includes at least two audio sources, step (a) includes a step of selecting one reverberation filter (e.g., a filter for a representative one of the audio sources), and the method also includes a step of generating wet mixed audio by: generating mixed audio by mixing input audio from at least a first client and a second client; and applying an early reverberation filter (an early reverberation part of the selected reverberation filter) to the mixed audio to generate wet mixed audio. In this case, the metadata is sufficient to enable a third client to apply a late reverberation filter (e.g., a late reverberation part of the selected reverberation filter) to the wet mixed audio, and step (b) includes a step of asserting the wet mixed audio (which may be or include wet mixed speech data) and the metadata to the third client. In this case also, the third client is preferably configured to reconstruct an approximation of a dry version of the wet mixed audio and to apply the late reverberation filter to the reconstructed dry version of the wet audio.

In other embodiments in the second class, the group of sources consists of one audio source, and step (a) also includes a step of generating wet audio by applying an early reverberation filter (an early reverberation part of the selected reverberation filter) to input audio from a client (e.g., to input audio from a client indicative of an utterance of the audio source) to generate wet audio, the metadata is sufficient to enable a second client to apply a late reverberation filter (a late reverberation part of the selected reverberation filter) to the wet audio, and step (b) includes a step of asserting the wet audio (which may be or include wet speech) and the metadata to the second client. In this case, the second client is preferably configured to reconstruct an approximation of a dry version of the wet audio and to apply the late reverberation filter to the reconstructed dry version of the wet audio.

Typically, the server is operable in a mixing mode in which the server generates wet audio to be indicative of a mixture of wet versions of input audio streams from multiple clients (corresponding to a cluster of neighboring sources in the virtual environment), including by selecting different reverberation filters for different ones of the input audio streams (or a single reverberation filter for a single received input audio stream), applies the early reverberation part of each selected reverberation filter to the corresponding one of the input audio streams (e.g., the single received input audio stream), and then (in the case of multiple input audio streams) mixes the resulting wet streams to generate the wet audio that is asserted to a client. In the case of a single input audio stream, the wet data asserted to the client is indicative of the wet audio stream generated by applying the early reverberation part of the selected reverberation filter to the single input audio stream.

In typical embodiments in the second class (in the case of a cluster of input audio streams from multiple sources), the server is configured to select from a set of predetermined reverberation filters (e.g., a reverberation map including predetermined reverberation filters), for different pairs of predetermined key source and listener locations in the virtual environment, a reverberation filter for each different pair of source and listener positions (e.g., by selecting the predetermined filter which corresponds to a pair of predetermined key positions nearest to the relevant pair of source and listener positions). The server computes the gain for the direct propagation path assumed by each selected filter (for use in generating an envelope of a dry mix of the audio signals of the cluster), applies the early reverberation part of each selected filter to the corresponding one of the input audio streams to generate wet audio, and mixes the wet audio streams to generate a wet mixed audio for assertion to a client. Each selected filter typically has an N-block decay profile, and the early reverb portion of each selected filter is determined by the first X decay blocks in the N-block decay profile (where X is less than N, and typically X is much less than N). The server asserts cluster data indicative of (e.g., including) the wet mixed audio and metadata to the client, where the metadata is sufficient to enable the client to apply a late reverberation filter determined from the selected filters for the cluster (typically, a late reverberation part of a representative one of the selected reverberation filters for the cluster) to the wet mixed audio indicated by the cluster data. Typically, the metadata is indicative of an envelope of a dry mix of the audio signals of the cluster, and also the decay profile of the late reverberation filter for the cluster.

Alternatively, the server in the mixing mode generates wet mixed audio (indicative of audio from a cluster of sources) in response to multiple input audio streams from clients, including by selecting one reverberation filter (as being representative of the sources in the cluster), and applying the early reverberation part of the selected reverberation filter to a mixed version of the input audio streams of the cluster to generate wet mixed audio for assertion to a client (or applying the early reverberation part of the selected reverberation filter to each of the input audio streams of the cluster and mixing the resulting wet streams to generate wet mixed audio for assertion to a client). The server asserts cluster data indicative of (e.g., including) the wet mixed audio and metadata to each of the clients, with the metadata being sufficient to enable the client to apply a late reverberation part of a representative reverberation filter (for the cluster) to the wet mixed audio indicated by the cluster data.

In typical embodiments in the second class, the server is also operable in a forwarding mode in which the server forwards input audio from at least one client to a second client, and asserts metadata to the second client, where the metadata is sufficient to enable the second client to apply the reverberation filter (selected in step (a)) to the input audio. Preferably, the server is configured to switch between the forwarding mode and a mixing mode. Preferably also, each server and client that generates wet audio by applying a reverberation filter (e.g., an early or late reverberation part of a reverberation filter) to a sequence of audio packets from which at least one packet has been lost, is configured to generate the wet audio without artifacts due to loss of at least one of the packets.

In another class of embodiments, the invention is a method for applying a reverberation filter to audio data from a server, including steps of:

(a) at a client, receiving early reverberant audio data and metadata from the server, where the early reverberant audio data is indicative of a wet version of input audio to which early reverberation has been applied (e.g., the early reverberant audio data is indicative of a wet mixed cluster of input audio streams), and the metadata is indicative of a late reverberation filter and is sufficient to enable the client to reconstruct an approximation of a dry version of the input audio; and (b) in the client, reconstructing dry audio in response to the early reverberant audio data and the metadata, wherein the dry audio is an approximation of a dry version of the input audio, generating late reverberant audio by applying the late reverberation filter to the dry audio, and generating wet output audio data by mixing the late reverberant audio and the early reverberant audio data.

In the case that the early reverberant audio data is indicative of a wet mixed cluster of input audio streams, the metadata may be indicative of an envelope of a dry mix of the input audio streams of the cluster, and a decay profile of the late reverberation filter for the cluster. In the case that the early reverberant audio data is indicative of a wet version of a single stream of input audio (e.g., a wet mixed cluster of input audio streams) to which the early reverberation has been applied, the metadata may be indicative of an envelope of a dry version of the input audio stream, and a decay profile of a late reverberation filter for the input audio stream.

The metadata may be reverberation data, indicative of a reverberation decay profile of the late reverberation filter (in response to which the client can construct the late reverberation filter) or an index to a table storing a reverberation decay profile of the late reverberation filter (in response to which the client can retrieve the stored decay profile and use the retrieved decay profile to construct the late reverberation filter).

Typically, the early reverberant audio data (and optionally also the metadata) are received in packets (e.g., cluster packets). For example, the client may receive cluster data indicative of a sequence of cluster packets, where the cluster data includes the audio data and the metadata.

Optionally, the method also includes the steps of:

(c) at the client, receiving dry audio data and full reverberation metadata from the server, where the dry audio data is indicative of dry input audio forwarded by the server, and the full reverberation metadata is indicative of a full reverberation filter; and (d) in the client, generating reverberant audio data by applying the full reverberation filter to the dry audio data.

The full reverberation metadata may be reverberation data, indicative of a reverberation decay profile of the full reverberation filter (in response to which the client can construct the full reverberation filter) or an index to a table storing a reverberation decay profile of the full reverberation filter (in response to which the client can retrieve the stored decay profile and use the retrieved decay profile to construct the full reverberation filter).

Typically, the client is operable in a first mode (in which it performs steps (a) and (b) in response to early reverberant audio data and metadata) and in a second mode (in which it performs steps (c) and (d) in response to dry audio data and full reverberation metadata). The client operates in the first mode in response to receiving first control data (e.g., with the early reverberant audio data and the metadata), and the client operates in the second mode in response to receiving second control data (e.g., with the dry audio data and the full reverberation metadata).

Other aspects of the invention are systems, servers, and client devices configured (e.g., programmed) to perform any embodiment of the inventive method, and a computer readable medium (e.g., a disc) which stores code for implementing any embodiment of the inventive method.

Typical embodiments of the inventive system and method employ an audio server, preferably an audio server that is implemented in a simple, inexpensive manner. The audio server may be configured to operate with a game server to execute a game (e.g., a multiplayer game in which the players assert audio and game data to one or both of the servers from client devices). Preferably the audio server is configured to operate in a forwarding mode in which it forwards audio data (e.g., speech data, which may be compressed packets of speech data) from one or more client device(s) to one or more other client device(s), without decoding or otherwise processing the audio data. Preferably, the audio server is also configured to operate in a mixing mode in which it mixes uncompressed streams of audio data (e.g., streams of speech data) from several client devices (including by decompressing the audio data streams prior to mixing if they arrive in compressed form) and asserts the resulting mixed audio data (e.g., mixed speech data, which may be packets of mixed speech data) to client devices. A simply implemented audio server of this type can easily be configured to perform reverberation processing in accordance with the invention. For example, in a typical embodiment, the audio server is configured to select a reverberation filter (from a reverberation map or other database of precomputed reverberation filters) to be applied to audio data received from one or more of the client devices, in response to position data indicative of position of each of at least one audio source in a virtual environment. In the forwarding mode, this embodiment of the audio server asserts (with the forwarded audio) reverberation data (sometimes referred to herein as metadata) indicative of the selected reverberation filter to be applied to the forwarded audio data (e.g., forwarded packets of audio data). In the mixing mode, this embodiment of the audio server generates wet mixed audio data by applying an early reverberation part of the selected filter to the mixed audio data it generates (or to the individual audio streams which it then mixes to generate the wet mixed audio data) and asserts (with the wet mixed audio data) reverberation data indicative of a late reverberation part of the selected reverberation filter to be applied by each client device to the wet mixed audio data.

In preferred embodiments in which an audio mixing server is configured to perform reverberation processing in accordance with the invention, the server has input ports and output ports (for coupling via one or more networks to client devices) and is configured to perform selective switching of each speech stream received at one of the input ports from a client device, and each speech stream generated in the server, to selected ones of the output ports. For example, in response to receiving a speech stream (S1) at one input port and a speech stream (S2) at another input port, the server may generate a wet mixed version (S3) of the S1 and S2 streams, and selectively pass either the S1 or S2 stream, or the S3 stream, to each output port.

In accordance with some embodiments of the inventive method, a voice chat system (e.g., an in-game voice chat system) performs real-time, speech-driven, reverberation processing. For example, the system may automatically replace a user's "dry" input speech with a "wet" speech to which reverb (typically, early reverb) has been applied.

In typical embodiments, the inventive system, server, or client device is or includes a general or special purpose processor programmed with software (or firmware) and/or otherwise configured to perform an embodiment of the inventive method. In some embodiments, the inventive system, server, or client device is implemented by appropriately configuring (e.g., by programming) a configurable audio digital signal processor (DSP), or a many core processor such as a GPU (graphics programming unit) or stream processor.

In some embodiments, the inventive system is or includes a processor (e.g., it is a server including a processor) coupled to receive input audio data (e.g., data indicative of input speech) and programmed to generate to select a reverberation filter (from a set of predetermined reverberation filters) for filtering the input audio data, and to generate (by performing an embodiment of the inventive method) output data indicative of a wet version of the input audio to which an early reverberation part of the reverberation filter has been applied, wherein the output data includes metadata sufficient to enable a client device to apply a late reverberation part of the reverberation filter (or the entire reverberation filter) to the input audio data (e.g., to an approximation of the input audio data reconstructed from the output data). In some embodiments, the inventive system is or includes a processor (e.g., it is a client device including a processor) coupled to receive audio data indicative of a wet version of input audio to which an early reverberation part of the reverberation filter has been applied, and metadata sufficient to enable the system to apply a late reverberation part of the reverberation filter (or the entire reverberation filter) to an approximation of the input audio reconstructed from the audio data), wherein the system is programmed to generate output data indicative of a wet version of the audio data indicative of the input audio to which the reverberation filter has been applied.

DETAILED DESCRIPTION OF THE PREFERRED EMBODIMENTS

Throughout the disclosure, including in the claims, the expression "reverberation data" denotes a reverberation decay profile or an index to a table storing reverberation decay profiles. Each decay profile itself is typically an array of decay blocks or pointers to decay blocks. Each decay block stores an attenuation value computed for a number (sometimes denoted herein as "NBBANDS") of frequency subbands. An exemplary C-like structure indicative of reverberation data is given by the following pseudo-code:

```
struct Reverb
{
    Int initialDelayGap; // in frames
    DecayBlock list [ ]; // [ ] denotes an array of values
}.
```

An exemplary C-like structure indicative of a decay block is given by the following pseudo-code:

```
struct DecayBlock {
    unsigned char direction;
    unsigned char diffusiveness;
    unsigned char attenuation[NBBANDS];
}.
```

Throughout this disclosure, including in the claims, the term "speech" is used in a broad sense to denote audio signals perceived as a form of communication by a human being, a beast or an object (e.g., an object or character in a virtual world, said object or character being capable of uttering speech). Thus, "speech" determined or indicated by an audio signal may be audio content of the signal that is perceived as speech (e.g., dialog, monologue, or singing) upon reproduction of the signal by a loudspeaker (or other sound-emitting transducer). Herein, speech "in a language" denotes speech perceived as being in a language, whether the language is intelligible or unintelligible to the listener.

Throughout the disclosure, including in the claims, the expression "voice data" (or "speech data") denotes an audio data stream (typically a compressed audio data stream) indicative of speech. The audio data stream may be output from a client device (e.g., may be indicative of speech uttered by a user of the client device), or generated by combining (e.g., mixing) audio streams output from two or more client devices, or may be generated in another manner. The audio data stream can be indicative of a mixture of one or more voice streams and can (but need not) include early reverberation applied by a server. Voice data can be limited to the spectral envelope(s) of the original utterance(s) and not include actual compressed audio data. An exemplary C-like structure indicative of voice data is given by the following pseudo-code:

```
struct VoiceData
{
    uchar dryEnvelope [ ];
    uchar envelope [ ];
    uchar compressedData [ ];
}.
```

In other examples, the structure "uchar dryenvelope" (an envelope of dry audio) in the previous example is generalized to the structure "uchar very_lowbitrate_data" which is low bitrate data (e.g., very low bitrate compressed data) indicative of, or characterizing, the dry audio. In the case that only the spectral envelope is transmitted, a reconstruction of the phase can be recovered from previously received frames or transmitted as very low bit rate side information or the full signal can be sent using a very low bitrate as it will typically be lowpass filtered and convolved with a noise sequence during the reverberation process.

Throughout the disclosure, including in the claims, the expression "cluster data" denotes data indicative of a cluster (e.g., an encoded cluster) of audio data streams (e.g., voice data streams). Cluster data can include audio data (e.g., dry or wet audio data indicative of one or more voice streams, or a set of mixed voice streams) and optionally also reverberation data (e.g., reverberation data indicative of a reverberation decay profile of a reverberation filter which has been applied, or is to be applied, to the audio data). In some embodiments of the invention, cluster data is transmitted (e.g., from a server to a client) in data structures known as packets (sometimes referred to herein as "cluster packets"). An exemplary C-like structure indicative of cluster data is given by the following pseudo-code:

```
struct Cluster
{
    unsigned char direction;      // position of direct or early scattered energy
    float directPathGain;         // gain of the direct path (used only for forwarded clusters)
    VoiceData data;               // audio data for cluster
    Reverb data;                  // reverb data for cluster
}.
```

Many embodiments of the present invention are technologically possible. It will be apparent to those of ordinary skill in the art from the present disclosure how to implement them. Embodiments of the inventive system, method, and medium will be described with reference to FIGS. 3, 4, and 5.

Figure 3:
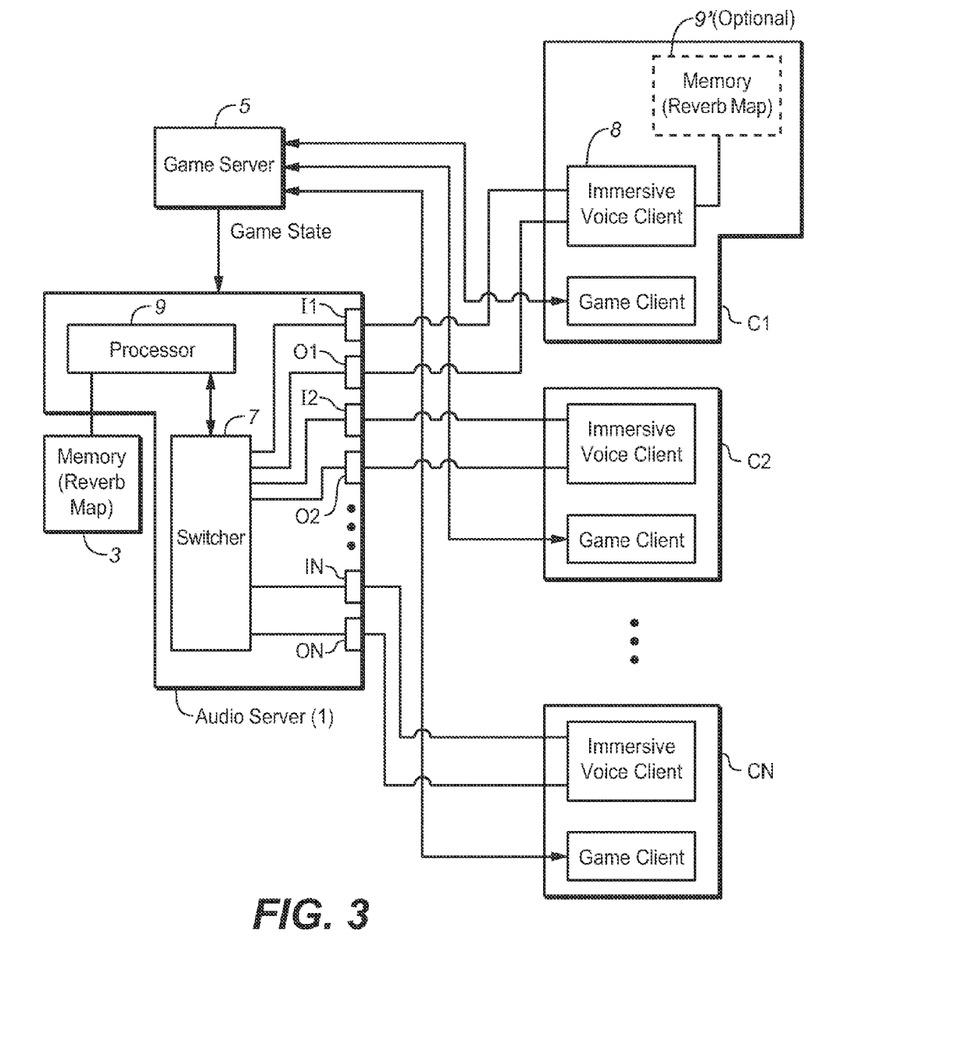
FIG. 3 is a block diagram of an embodiment of the inventive system.

FIG. 3 is a block diagram of an embodiment of the inventive system which implements split client-server reverberation processing in accordance with an embodiment of the invention. The system of FIG. 3 includes audio mixing server 1, memory 3 coupled to server 1, game server 5 coupled to server 1, and a set of N client devices C1, C2, . . . , CN (where N is an integer). Each of devices C1, C2, . . . , CN is coupled to audio server 1 via a network (e.g., a local network or the internet). More specifically, input port I1 and output port O1 of server 1 are coupled to device C1, and input port I1 and output port Oi of server 1 are coupled to device Ci, for each index "i" in the range 1<i≤N.

Servers 1 and 5 are configured to execute a game (and/or to implement a chat room) in response to input data (including speech data) and commands from one or more of client devices C1, C2, . . . , CN (e.g., in response to input data and commands from one of the client devices in a single-player mode of a game, or from all of the client devices in an N-player mode of a game), including by asserting audio, text, and video data via the network(s) to the client devices. Game server 5 is aware of the global state of the game. Audio server 1 can be implemented in a simple, inexpensive manner, and includes switching subsystem 7 configured to forward speech data (e.g., compressed packets of speech data) from each of the client devices to each of all or some of the client devices, without decoding or otherwise processing the speech data. Processing subsystem (processor) 9 of audio server 1 is configured to perform processing on uncompressed voice streams (including reverberation filtering and mixing of the voice streams) received at all or some of input ports I1-IN from two or more of client devices C1-CN (in some implementations, including by decompressing the voice streams prior to filtering and mixing if the streams arrive in compressed form) and to assert the filtered, mixed voice stream to all or some of output ports O1-ON (for transmission to all or some of client devices C1-CN).

Processor 9 is coupled to subsystem 7 and to memory 3 as shown, and configured to perform reverberation filtering in accordance with an embodiment of the present invention. In preferred implementations, subsystem 7 of server 1 is configured to forward unfiltered (dry) speech streams from one or more of client devices C1-CN to one or more of the devices C1-CN, and to assert filtered (wet) speech generated by processing subsystem 9 (and/or other data for use by client devices C1-CN to perform reverberation filtering) to one or more of devices C1-CN.

Game server 5 and audio server 1 could both be implemented in software that runs on a single computer, or game server 5 could be implemented as an appropriately programmed computer and audio server 1 as another appropriately programmed computer. The latter two computers, which could be located in the same facility or in different locations, would typically communicate with each other over a network (e.g., the internet).

Each of client devices (clients) C1-CN includes a game client (coupled and configured to interact with game server 5) and an immersive voice client (coupled and configured to interact with audio server 1). Optionally, each client device includes a memory which stores a reverberation map (of a type to be described below). For example, client device C1 of FIG. 3 includes memory 9 (which stores a reverberation map) coupled and configured to interact with device C1's voice client 8. Typically, the voice client and game client of each client device are implemented in software that runs on a single computer.

Still with reference to FIG. 3, audio server 1, and each of client devices C1-CN, is configured to perform an embodiment of the inventive method.

Each of client devices C1-CN is configured to perform the following tasks:

receive audio packets (e.g., voice data packets) and metadata from audio server 1. The metadata may identify a reverberation filter to be applied to the audio data in the packets (e.g., it may identify one of a set of predetermined filters that is stored in the client device) or it may be or include such a reverberation filter;

apply a full reverberation filter determined by metadata received from server 1 (to implement both early and late reverberation effects) to dry voice packets received from (e.g., forwarded by) server 1;

apply a late reverberation filter determined by metadata received from server 1 to mixed (cluster) packets received from server 1 (these packets are indicative of wet audio generated by server 1 by applying early reverb to dry audio. Typically the wet audio is indicative of a mixture of audio streams from two or more of the clients to which the early reverb has been applied), including by reconstructing the dry audio (to which server 1 had applied early reverb), applying late reverb to the reconstructed dry audio, and mixing the resulting wet audio (to which late reverb has been applied by the client device) with the wet audio (to which early reverb has been applied by server 1) received from server 1; and maintain a queue of past audio signals (dry or wet depending on the operating mode) received from server 1 (or reconstructed from packets received from server 1) for use in applying the determined reverberation filter.

In typical operation, each client of a subset of clients C1-CN (where the subset consists of at least one of the clients C1-CN) asserts audio data to audio server 1. Game server 5 (or each client of the subset of clients C1-CN) also asserts to audio server 1 position data indicative of position in the virtual environment of the source of audio data asserted by each client of the subset (and of the position in the virtual environment of each other client to which the audio data will be asserted). The position of each source of audio data (and more generally, of each game player or chat participant) can be determined by game server 5 from data (e.g., game data) received by server 5 from the client(s). In some implementations, server 5 (or server 1) determines one representative position (in the virtual environment) from a set of two or more positions of sources of audio data from two or more of the clients (e.g., the representative position is the position of one source of a set, or cluster, of neighboring sources in the virtual environment).

Server 1 is configured to perform the following tasks:

query a database of precomputed reverberation filters (e.g., a reverberation map stored in memory 3) based on the position of each relevant source and listener in the virtual environment, to select a reverberation filter for filtering audio data corresponding to a source position (or set of source positions) indicated by position data asserted to server 1. Typically, a different filter can be independently selected for each of the clients (for filtering audio data to be asserted to said each of the clients), in response to current position of a listener (the position in the virtual environment associated with the client to receive the audio data to be filtered) and current position of a source. In the case of multiple streams of audio from a set (cluster) of sources (e.g., neighboring sources) in the virtual environment, the streams are typically mixed together (before or after application of reverb thereto), and a single representative source position for the cluster is used to select a single reverberation filter for all sources in the cluster. Each precomputed filter corresponds to a source and listener at a pair of predetermined key locations, and the selected filter is typically one whose key locations correspond most closely to the current source and listener positions;

if server 1 is operating in a mixing mode, determine a set of audio signals (in response to voice data or other audio data received from multiple client devices and corresponding source position data, e.g., from game server 5) to be mixed and reverberant to produce a cluster of audio signals, apply the appropriate reverberation filter to each audio signal in the set (thereby generating wet signals), and mix the wet signals to generate wet mixed audio for the cluster (or mix the dry signals in the set, and apply the appropriate reverberation filter to the resulting mixed signal to generate the wet mixed audio). Typically, the reverberation processing will be limited to application reverb indicative of early reflections defined by a cut-off time or a cut-off number of audio data frames, so that server 1 applies only an early reverberation filter to each audio signal in the set (or to a mixed version of the signals in the set) rather than a full reverberation filter. For example, for an audio signal of duration 3.5 seconds (and a full reverberation filter for applying reverb to the audio signal having a duration of 3.5 seconds), the early reverberation filter applied by server 1 may have duration much shorter than 3.5 seconds (e.g., it may have a duration of 0.5 second). Because each early reverberation filter applied by server 1 typically has duration much shorter than that of the full reverberation filter (of which it is a part), early reverberation can typically be applied efficiently by a simple implementation of server 1 to multiple audio signals (and late reverberation can subsequently be applied by a client device to the resulting wet audio). The foregoing description is also intended to cover the case that the set of audio signals to which early reverb is applied by server 1 consists of a single audio signal (so that the wet mixed audio for the cluster is generated by applying early reverb to this signal);

if server 1 is operating in the mixing mode, select an appropriate late reverberation filter that each relevant one of the clients can apply to the wet mixed audio of each cluster;

if server 1 is operating in the mixing mode, send to each relevant client information (metadata) necessary to enable the client to reconstruct a dry version of the wet mixed audio for each cluster (to which server 1 has applied early reverb) and enable the client to perform late reverberation processing on the reconstructed dry audio. The metadata may identify a late reverberation filter to be applied to the dry audio (e.g., it may identify one of a set of predetermined filters that is stored in the client) or it may be or include such a late reverberation filter;

if server 1 is operating in a forwarding mode, send to each relevant client information (metadata) necessary to allow the client to perform full reverberation processing (including application of both early and late reverberation) to dry audio forwarded by server 1. The metadata may identify a reverberation filter to be applied to the dry audio (e.g., it may identify one of a set of predetermined filters that is stored in the client) or it may be or include such a reverberation filter; and maintain a queue of the past audio signals (e.g., audio packets) received from each client device for use in applying each reverberation filter applied during the mixing mode.

As noted above, source position updates can be provided to audio server 1 from game server 5 or directly to audio server 1 from the client devices. For specificity, the following description of typical embodiments assumes that the position updates are sent directly to server 1 from each client device (with the audio data from each client device).

In operation, some embodiments of the FIG. 3 system implement a voice chat system (e.g., an in-game voice chat system) in which server 1 and at least one client device perform real-time, split (distributed) reverberation filtering of audio data. For example, the system may automatically replace dry input speech uttered by a user of client device C1 (or a mixture of dry input audio speech uttered by users of devices C1 and C2) with wet output speech to which reverb has been applied.

Figure 4:
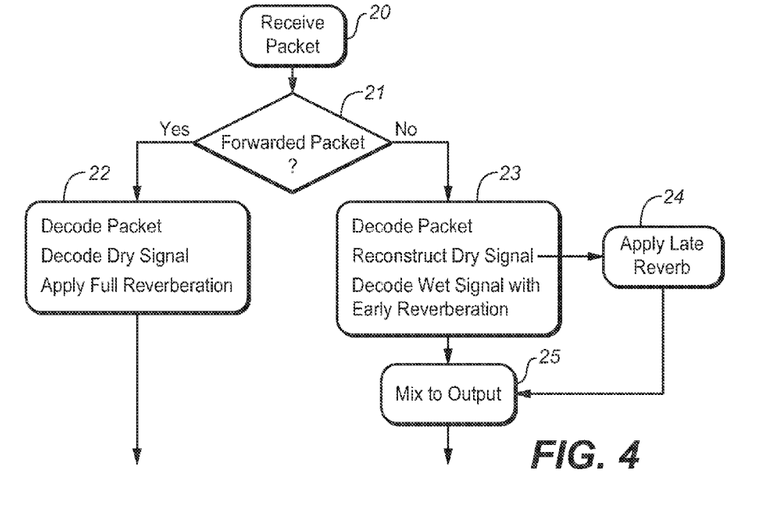
FIG. 4 is diagram of steps of an embodiment of the inventive method.

FIG. 4 illustrates client-side reverberation processing performed by a client device (e.g., each of client devices C1-CN of FIG. 3) in a class of embodiments of the invention. The client-side processing can follow two different paths based on the type of packets received (in step 20 of FIG. 4) from the server (e.g., server 1 of FIG. 3).

In step 21 of FIG. 4, the client device determines (e.g., in response to control data provided with a stream of received packets) whether each received packet:

is a forwarded packet (e.g., is a packet generated by server 1 operating in the above-mentioned forwarding mode), in which case the packet is assumed to include dry audio data from only a single source; or is not a forwarded packet, in which case the packet is assumed to include wet mixed audio data from multiple sources (e.g., is a cluster packet generated by server 1 operating in the above-mentioned mixing mode) or wet audio data from a single source (in this latter case, we will also refer to the packet as a cluster packet, for simplicity).

The client device performs step 22 in the case that a received packet is a forwarded packet including dry audio data from only a single source. In performing step 22, the client fully decodes the dry audio included in the packet (if the packet includes an encoded version of the dry audio) and applies a full reverberation filter determined by (e.g., included in) metadata received with (e.g., included in) the packet from the server to the dry audio. Typically, the filter application step includes application to the dry data of a full set of reverberation data determined by (or included in) the metadata, and noise which determines (with the reverberation data) the reverberation filter. The method described above with reference to FIG. 2 (or another reverberation filtering method) can be used to perform the reverberation filtering on the dry audio.

The client device performs steps 23, 24, and 25 in the case that a received packet is not a forwarded packet. In this case, the received packet contains wet (early reverberant) audio mixed from multiple sources or wet (early reverberant) audio from a single source). The client (in step 23) fully decodes the wet audio (to which early reverb has been applied by the server) if the packet includes an encoded version of the wet audio, and also employs metadata (e.g., provided with a stream of received packets of wet audio) to determine (e.g., by decoding) the envelope of dry audio from which the wet audio was generated (in the server) and to use the envelope to reconstruct the dry audio (i.e., to determine an approximation of the dry audio) from the wet audio. Or, metadata provided with a stream of received packets of wet audio) otherwise determines at least a characteristic of the dry audio from which the wet audio was generated (in the server) and the metadata is used with the wet audio to reconstruct the dry audio (i.e., to determine an approximation of the dry audio).

The client (in step 24) also applies to the reconstructed dry audio a late reverberation filter determined by (e.g., included in) metadata received with (e.g., included in) the packet from the server (e.g., metadata provided with a stream of received cluster packets including the packet). Typically, the client accomplishes this by applying to the reconstructed dry audio a late reverberation filter determined by (or included in) the metadata (e.g., a late reverberation filter determined by a subset of a full set of reverberation data determined by or included in the metadata). The late reverberation filter can be applied in a manner similar to that described above with reference to FIG. 2, with the late reverberation filter consisting of only the last M blocks of a full N-block filter of the type shown in FIG. 2, and the filter application comprising convolution in the frequency domain by multiplying each of the M filter blocks, each corresponding to a different time window, with corresponding frequency components of the same time window of the reconstructed dry audio signal (in the same time window).

The resulting wet signal (to which the client has applied late reverb) is mixed (in step 25) with the received wet audio (to which early reverb was applied by the server). Thus, a late reverberation filter (typically having a late reverberation decay profile determined by reverberation data received with the packets) is applied to the reconstructed dry audio determined from the packets, and the resulting wet audio signal (to which the client has applied late reverb) is mixed with the received wet audio (to which early reverb was applied by the server).

As described, reverberant ("wet") audio in cluster packets is generated by embodiments of the inventive server as a result of early reverberation processing in the server. In order to generate the appropriate late reverberation signal (e.g., the output of step 24 of FIG. 4), the client device must be able to cancel the reverberated part of the received wet audio in order to obtain a dry audio signal (to which the client can apply a late reverberation filter indicated by metadata received from the server with the cluster packets). In typical embodiments, the client device performs the step of reconstructing a dry audio signal from the wet audio in received cluster packets in the following manner. Metadata generated by the server, and provided with (e.g., included in) the cluster packet is indicative of an estimate of the spectral magnitude of the dry signal to which the server applied the early reverb. The client device uses this metadata, and the phase of the wet signal, to reconstruct (at least approximately) the dry signal. The client device then applies late reverb to the reconstructed dry signal, typically by convolution with a late reverberation filter.

In other embodiments, the client device implements alternative methods for reconstructing a suitable dry signal for convolution (e.g., minimum phase or random phase methods). Alternatively, the client may estimate the dry signal blindly from the wet signal. This latter solution would not require computing and transmitting additional information (e.g., metadata indicative of an estimate of the spectral magnitude of the dry signal) from the server but would result in a lower quality reconstruction of the dry signal by the client.

In typical embodiments, the client device applies a late reverberation filter to the reconstructed dry audio signal (reconstructed from wet audio in a sequence of received cluster packets), and then mixes the resulting wet signal with the original wet audio signal (to which early reverberation was applied in the server) to generate an output audio signal (on which the appropriate full reverberation processing has been performed). The output audio signal carries directional information (e.g., the direction of direct sound propagation from a source to the listener and/or that of an early reflection of the sound from the source). The late reverberation information indicated by the output signal can be either diffuse or hybrid directional and diffuse.

Figure 5:
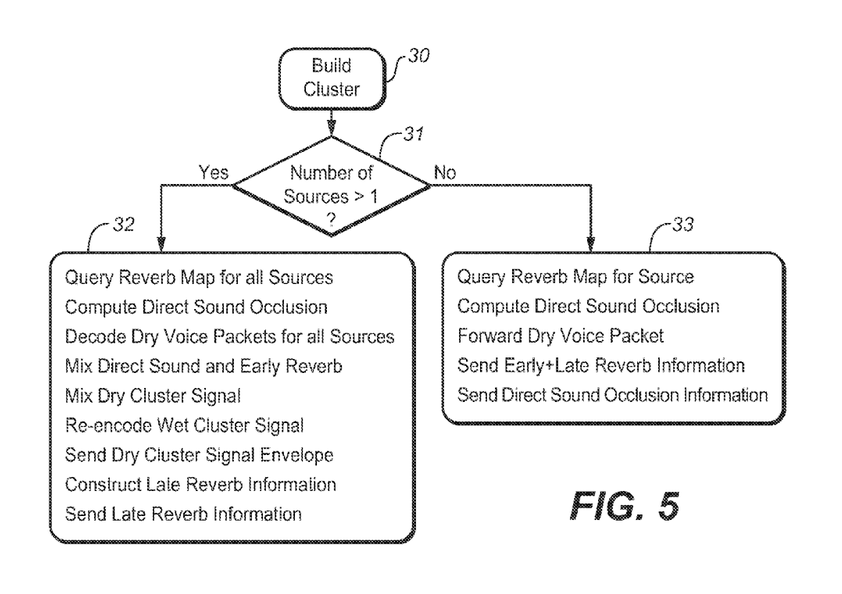
FIG. 5 is diagram of steps of an embodiment of the inventive method.

FIG. 5 illustrates server-side reverberation processing performed by a server (e.g., audio server 1 of FIG. 3) in a class of embodiments of the invention. The processing steps shown in FIG. 5 are those required for the server to generate audio that the server asserts to a single connected client. The same processing would have to be carried out for every client connected to the server.

In step 30 of FIG. 5, the server receives from each client its position signal (e.g., the position in the virtual environment of the user of the client device) and audio signal (e.g., speech utterances by the user of the client device). For each client, the server (in the mixing mode) builds a representation of the local auditory scene around the client (in the virtual environment) and outputs a limited number of audio streams corresponding to clustered voice sources. Each cluster corresponds to one local area (vicinity or neighborhood) in the virtual environment, and can contain one or more mixed speech streams. Each stream that is mixed to generate a single cluster corresponds to (is indicative of speech or other audio from) one or more connected clients "positioned" in the same local area of the virtual environment.

The FIG. 5 processing is repeated for each cluster of voices determined by the server. Two different processing paths are followed depending on the number of sources present in the cluster:

If audio from only one source is present in the cluster (i.e., if step 31 determines that audio data from only one source is present in the cluster), then step 33 is performed. To perform step 33, the server selects (from a reverberation map including predetermined reverberation filters for different combinations of source and listener locations in the virtual environment) a reverberation filter having an appropriate reverberation decay profile, computes the gain for the direct sound propagation path assumed by the selected filter, forwards to the client metadata indicative of this information (metadata indicative of the selected filter and the computed gain), and forwards the audio data to the client. If no direct sound is audible, the server can forward only the envelope of the audio signal.

If audio from at least two sources is present in the cluster (i.e., if step 31 determines that audio data (e.g., voice data) from at least two sources is present in the cluster), then step 32 is performed. To perform step 32, the server selects (from a reverberation map including predetermined reverberation filters for different combinations of source and listener locations in the virtual environment) reverberation filters (each for a different pair of source/listener positions) having appropriate reverberation decay profiles, computes the gain for the direct propagation path assumed by each selected filter, decodes and mixes the direct path audio for all sources (thereby computing a dry mix of the audio sources), applies early reverberation processing to the audio from all sources to generate wet mixed audio data, encodes and sends to the client the full set of wet mixed audio data and the envelope of the dry mix (or another low bitrate representation, preferably a very low bitrate representation, of the dry cluster signal), and selects an appropriate late reverb decay for each cluster and sends to the client metadata indicative of the late reverb decay for each cluster. The early reverberation processing includes steps of applying an early reverb portion of each of the selected reverberation filters to the corresponding stream of audio in the cluster (to generate a wet stream), and mixing the resulting wet streams of audio to generate the wet mixed audio data. The early reverb portion of each selected reverberation filter is determined by the first X decay blocks in the filter's N-block decay profile (where X is less than N). Application of the early reverb portion of each selected reverberation filter to the corresponding audio stream is equivalent to mixing the direct path audio of the stream with early scattered path audio of the stream.

Typically, the step of sending (e.g., forwarding) audio packets with reverberation decay information to the client is performed in one of two ways: the appropriate reverberation decay data is sent explicitly (with the audio data); or the server sends (with the audio data) metadata identifying a reverberation decay profile that is stored in the client. The reverberation decay information can be sent asynchronously at a lower bit-rate than the rate at which the audio packets are sent.

Since the early scattering will require higher update rates, an ID (identification) to an early decay profile can be sent at high rate (e.g., 17 Hz) while the later part of the reverb (or an ID thereto) can be sent at a lower rate (e.g., 1 to 5 Hz). To avoid storing a large database of late decay profiles on the client, the late decay information can be sent explicitly (rather than sending an ID pointing to client-side database) at the expense of more bandwidth.

Typically, to select an appropriate late reverberation filter for a cluster of participants, a representative late decay is determined for the cluster. This decay can be a linear combination of each source's late decay, scaled by the energy content in the input audio:

$$\text{attenuation\_}c[t](f) = \text{SUM } i=1 \ldots Nb\_\text{sources} \\ (Ei^* \text{attenuation\_}i[t](f)) / (\text{SUM } i=1 \ldots \\ Nb\text{Sources } Ei),$$

where $Ei$ is a short term estimate of the energy in the input audio of each source, and each summation is over the range of summation index values from $i=1$ to $i=$"Nb_sources" (the number of sources).

This gives precedence to the most perceptual important source in the mix, while still accounting for the late decay for the other sources. Alternatively, a representative late decay can be chosen as the late decay which maximizes the product of the input source energy and decay energy.

The early part of the reverberation processing can be implemented (in the server) as a block-based convolution between the voice streams and the selected filters. Typically, this processing is carried out in frequency domain (e.g., in a manner similar to that described above with reference to FIG. 2, with each early reverberation filter consisting of only the first X blocks of the full N-block filter shown in FIG. 2, and the filter application comprising convolution in the frequency domain by multiplying each of the X filter blocks, each corresponding to a different time window, with corresponding frequency components of the same time window of the dry audio signal (in the same time window)) to be compatible with traditional audio compression solutions. To carry out frequency domain processing, the dry audio to be filtered is transformed into the frequency domain, e.g., by performing a short time Fourier transform or modified cosine transform thereon. The split-up point between early and late reflections (e.g., the value of the integer X appearing above in this paragraph) can be variable so as to tradeoff processing between client and server.

If a sound source is not occluded by the geometry of the virtual environment, a direct copy of the input audio signal is also mixed into the cluster to simulate the direct propagation path between the source and the receiver.

The reverberant signal S_reverb[t](f) at time-frame t is obtained as:

$$S\_reverb[t](f) = distanceAttenuation * visibility * s[t](f) + SUM\ i=0\ldots Nb\_reverb\_blocks(s[t-i](f) * noise(f) * attenuation[t-i](f)),$$

for each frequency domain coefficient f, where the summation is over the range of summation index values from i=0 to i="Nb_reverb_blocks" (the number of reverberation filter blocks), noise(f) is a noise function in the chosen frequency domain (e.g., the transform of a time domain white noise process), s(f) is the source signal also in transform domain, * denotes scalar multiplication (in MDCT domain) or complex multiplication (in the STFT domain), the attenuation coefficients correspond to the attenuation array stored into the chosen reverberation decay profile, "visibility" is a binary value corresponding to the state of line-of-sight occlusion between the source and the listener (visible or invisible), and "Distance attenuation" is typically 1/r for a source and receiver separated by r meters. Interpolating the attenuation coefficients when switching decay profiles is also desirable and can be implemented by interpolating between the set of old and new P coefficients attenuation[t−i] for each frame t−i. A typical time-constant for the interpolation is ~1 sec.

The visibility term is preferably smoothed to avoid discontinuities. In some embodiments, the visibility term is interpolated using an asymmetrical time constant, shorter when moving in visibility and longer when moving out of visibility, as this provides more consistent feedback with visuals. When fading out of visibility, an additional low pass filtering effect can be added to the direct path to simulate line of sight diffraction if this effect is not already simulated in the precomputed decay data.

The final cluster signal C[t](f) at time-frame t can be generated as:

$$C[t](f) = SUM\ i=1\ldots Nb\_sources(Si\_reverb[t](f)),$$

where the summation is over the range of summation index values from i=1 to i="Nb_sources" (the number of sources).

To allow the client to reconstruct the dry signal of each cluster, the server preferably simply computes and sends to the client an estimate of the spectrum of each dry cluster signal, e.g. in different frequency sub-bands.

The client can than compute the dry signal as:

$$C\_dry[t](f) = SUM\ i=1\ldots Nb\_sources(Si[t](f)),$$

where the summation is over the range of summation index values from i=1 to i="Nb_sources" (the number of sources).

The dry signal for each cluster can be sent as a spectral envelope if only the late reverberation must be computed on the client (i.e., the direct and early reverberated signal is zero). This can be useful to avoid discontinuities when sources are moving further away from the listener without introducing a significant increase in bandwidth.

In order for a client device to properly generate a reverberated signal, a consistent set of past values must be available for each cluster packet and forwarded packet since the reverberation processing requires knowledge of past values of the signals. A local cache of such past values can be maintained on the client side in order for the client to store an approximation of the dry signal for each received packet. The cache will be progressively filled by incoming dry voice signal packets or estimated dry-signals reconstructed from cluster packets.

When late reverberation filter information is modified for the cluster packets, the new late decay is progressively interpolated (by the client) from the previously active late decay in order to avoid discontinuities in a similar way to the server-side early decay interpolation. A longer time constant can be used as the late reverberation filters are generally smoothly varying.

In preferred embodiments, in the case of lost packets, the reverberation processing by each client can fill in missing information with a reverberant signal instead of outputting a blank frame and creating a discontinuity in the audio.

In some embodiments, the inventive system is or includes a general or special purpose processor programmed with software (or firmware) and/or otherwise configured to perform an embodiment of the inventive method. For example, server 1 (or subsystems 7 and 9 of server 1) of FIG. 3, or each client device of above-described FIG. 3, could be implemented as general purpose processor. In other embodiments, the inventive system is implemented by appropriately configuring (e.g., by programming) a configurable audio digital signal processor (DSP) to perform an embodiment of the inventive method. The audio DSP can be a conventional audio DSP that is configurable (e.g., programmable by appropriate software or firmware, or otherwise configurable in response to control data) to perform any of a variety of operations on input speech data.

Aspects of the invention are a computer system programmed to perform any embodiment of the inventive method, and a computer readable medium which stores computer-readable code for implementing any embodiment of the inventive method.

While specific embodiments of the present invention and applications of the invention have been described herein, it will be apparent to those of ordinary skill in the art that many variations on the embodiments and applications described herein are possible without departing from the scope of the invention described and claimed herein. It should be understood that while certain forms of the invention have been shown and described, the invention is not to be limited to the specific embodiments described and shown or the specific methods described.

What is claimed is:

1. A method for applying reverberation to audio from at least one client of a set of clients which share a virtual environment, said method including steps of:
    (a) asserting position data and at least one input audio stream to a server, wherein each said input audio stream is indicative of audio from a different one of the clients, the position data is indicative of a listener position and at least one source position in the virtual environment, and each said source position is a position in the virtual environment of a source of one said input audio stream;

(b) in response to the position data, operating the server to select a reverberation filter for each said input audio stream; and (c) generating a wet audio stream for each said input audio stream, by operating the server to apply to the input audio stream an early reverberation part but not a late reverberation part of the reverberation filter selected for said input audio stream.

2. The method of claim 1, wherein each said input audio stream corresponds to a source at a different source position in the virtual environment, and step (b) includes a step of selecting the reverberation filter for each said input audio stream from a set of predetermined filters, each of the predetermined filters corresponding to a different pair of predetermined source and listener positions, such that the predetermined source and listener positions for the filter are a best match to the source position corresponding to the input audio stream and the listener position indicated by the position data.

3. The method of claim 1, wherein the listener position is indicative of position in the environment of a user of a first one of the clients, and each said input audio stream is indicative of audio data from a different one of the clients.

4. The method of claim 3, wherein at least two input audio streams are asserted to the server in step (a), each of the input audio stream is indicative of speech data from a different one of the clients, at least two wet audio streams are generated in step (c), and the method also includes steps of:

mixing the wet audio streams to generate wet mixed audio data, and asserting the wet mixed audio data to the first one of the clients.

5. The method of claim 1, wherein the server and the clients implement a voice-over internet protocol, in which each said input audio stream asserted to the server is indicative of speech by an audio source in the virtual environment.

6. The method of claim 1, wherein the reverberation filter has an N-block decay profile, and the early reverberation part of the reverberation filter is determined by the first X decay blocks in the N-block decay profile, where X is less than N.

7. A system for applying reverberation to audio, including:
a server; and
a set of clients which share a virtual environment, wherein each of the clients is coupled and configured to assert to the server an audio stream indicative of audio from said each of the clients,
wherein the server is configured to operate in a mode in which the server selects a reverberation filter for each input audio stream asserted thereto from one of the clients, in response to position data indicative of a listener position and at least one source position in the virtual environment, wherein each said source position is a position in the virtual environment of a source of one said input audio stream, and wherein the server is configured to generate a wet audio stream for each said input audio stream by applying to the input audio stream an early reverberation part but not a late reverberation part of the reverberation filter selected for said input audio stream.

8. The system of claim 7, wherein each said input audio stream corresponds to a source at a different source position in the virtual environment, and the server is configured to select the reverberation filter for each said input audio stream from a set of predetermined filters, each of the predetermined filters corresponding to a different pair of predetermined source and listener positions, such that the predetermined source and listener positions for the filter are a best match to the source position corresponding to the input audio stream and the listener position indicated by the position data.

9. The system of claim 7, wherein the listener position is indicative of position in the environment of a user of a first one of the clients, and each said input audio stream is indicative of audio data from a different one of the clients.

10. The system of claim 9, wherein the server is configured to generate at least two wet audio streams in response to at least two input audio streams asserted to the server from the clients, to mix the wet audio streams to generate wet mixed audio data, and to assert the wet mixed audio data to the first one of the clients.

11. The system of claim 7, wherein the server and each of the clients are configured to implement a voice-over internet protocol in which each said input audio stream asserted to the server is indicative of speech by an audio source in the virtual environment.

12. A method of operating an audio server in support of application of reverberation to audio data from at least one client of a set of clients sharing a virtual environment, said method including steps of:

(a) in response to position data indicative of positions in the virtual environment of a listener and of each source of a group of sources, selecting at least one reverberation filter for the listener and the group of sources, wherein said group comprises one or more audio sources; and (b) asserting metadata to a client, where the metadata is sufficient to enable the client to apply to audio a late reverberation filter determined by at least one said reverberation filter selected in step (a); and (c) applying an early reverberation filter, determined by or from at least one said reverberation filter selected in step (a), to input audio from at least one of the clients to generate wet audio.

13. The method of claim 12, wherein step (a) includes a step of selecting each said reverberation filter from a set of predetermined reverberation filters in response to the position data.

14. The method of claim 13, wherein each of the predetermined filters corresponds to a different pair of predetermined source and listener positions, and step (a) includes a step of selecting one said reverberation filter for each said source in the group such that the predetermined source and listener positions for the filter are a best match to the listener position and the source position of said source as indicated by the position data.

15. The method of claim 12, wherein the metadata is sufficient to enable a first client to apply the late reverberation filter to input audio from a second client, and step (b) includes a step of asserting the input audio and the metadata to the first client.

16. The method of claim 12, wherein the group of sources includes at least two audio sources, and step (a) includes a step of selecting at least two reverberation filters, each for a different one of the audio sources.

17. The method of claim 16, wherein said method also includes a step of generating wet mixed audio by:

applying a first early reverberation filter selected in response to the position data to input audio from a first client to generate first wet audio;

applying a second early reverberation filter selected in response to the position data to input audio from a second client to generate second wet audio; and mixing the first wet audio and the second wet audio, and wherein the metadata asserted in step (b) is sufficient to enable a third client to apply the late reverberation filter to the wet mixed audio, and step (b) includes a step of asserting the wet mixed audio and the metadata to the third client.

18. The method of claim 17, wherein the first early reverberation filter is an early reverberation part of a first one of the reverberation filters, and the second early reverberation filter is an early reverberation part of a second one of the reverberation filters.

19. The method of claim 18, wherein the late reverberation filter is a late reverberation part of one of the first one of the reverberation filters and the second one of the reverberation filters.

20. The method of claim 18, wherein the first one of the reverberation filters has an N-block decay profile, and the first early reverberation filter is determined by the first X decay blocks in the N-block decay profile, where X is less than N.

21. The method of claim 16, wherein the metadata is indicative of an envelope of a dry mix of input audio streams from at least two of the clients, the method also includes a step of generating wet mixed audio from the input audio streams, and the metadata is also indicative of a decay profile of a late reverberation filter for the wet mixed audio.

22. The method of claim 12, wherein the group of sources consists of one audio source, the metadata asserted in step (b) is sufficient to enable a second client to apply the late reverberation filter to the wet audio, and step (b) includes a step of asserting the wet audio and the metadata to the second client.

23. The method of claim 22, wherein the early reverberation filter is an early reverberation part of a first reverberation filter selected in step (a), and the late reverberation filter is a late reverberation part of the first reverberation filter.

24. The method of claim 12, wherein the group of sources includes at least two audio sources, and server is configured to select each said reverberation filter from a set of predetermined reverberation filters for different pairs of predetermined key source and listener locations in the virtual environment.

25. An audio server, including:
a processing subsystem coupled to receive position data indicative of positions in a virtual environment of a listener and a group of sources, wherein said group comprises one or more audio sources; and
at least one input coupled and configured to receive input audio data from clients sharing the virtual environment, where the input audio data includes an input audio stream from each of the clients, and each said input audio stream is indicative of audio from one of the sources in the group,
wherein the processing subsystem is coupled to the at least one input and is configured to perform operations of:
in response to the position data, selecting at least one reverberation filter for the listener and the group of sources;
generating metadata sufficient to enable a client to apply to audio a late reverberation filter determined by at least one said reverberation filter; and
applying an early reverberation filter, determined by or from at least one said reverberation filter, to input audio from at least one of the clients to generate wet audio.

26. A method for applying a reverberation filter to audio data from a server, including steps of:
(a) at a client, receiving early reverberant audio data and metadata from the server, where the early reverberant audio data is indicative of a wet version of input audio to which early reverberation has been applied, and the metadata is indicative of a late reverberation filter and is sufficient to enable the client to reconstruct an approximation of a dry version of the input audio; and
(b) in the client, reconstructing dry audio in response to the early reverberant audio data and the metadata, generating late reverberant audio by applying the late reverberation filter to the dry audio, and generating wet output audio data by mixing the late reverberant audio and the early reverberant audio data, wherein the dry audio is an approximation of a dry version of the input audio.

27. The method of claim 26, also including the steps of:
(c) at the client, receiving dry audio data and full reverberation metadata from the server, where the dry audio data is indicative of dry input audio forwarded by the server, and the full reverberation metadata is indicative of a full reverberation filter; and
(d) in the client, generating reverberant audio data by applying the full reverberation filter to the dry audio data.

28. A client configured to apply a reverberation filter to audio data from a server, said client including:
at least one input coupled and configured to receive early reverberant audio data and metadata from the server, where the early reverberant audio data is indicative of a wet version of input audio to which early reverberation has been applied, and the metadata is indicative of a late reverberation filter and is sufficient to enable the client to reconstruct an approximation of a dry version of the input audio; and
a processing subsystem coupled to the at least one input, wherein the processing subsystem is configured to perform operations of:
reconstructing dry audio in response to the early reverberant audio data and the metadata;
generating late reverberant audio by applying the late reverberation filter to the dry audio; and
generating wet output audio data by mixing the late reverberant audio and the early reverberant audio data, wherein the dry audio is an approximation of a dry version of the input audio.

29. The client of claim 28, wherein the early reverberant audio data is indicative of a wet mixed cluster of input audio streams, and the metadata is indicative of an envelope of a dry mix of the input audio streams of the cluster and a decay profile of the late reverberation filter for the cluster.

30. The client of claim 28, wherein the early reverberant audio data is indicative of a wet version of a single stream of input audio to which the early reverberation has been applied, and the metadata is indicative of an envelope of a dry version of the input audio stream and a decay profile of a late reverberation filter for the input audio stream.

31. The client of claim 28, wherein the metadata includes reverberation data indicative of a reverberation decay profile of the late reverberation filter.

32. The client of claim 28, wherein the metadata includes reverberation data indicative of an index to a table storing a reverberation decay profile of the late reverberation filter.

33. The client of claim 28, wherein the processing subsystem is also configured to generate reverberant audio data by applying a full reverberation filter to dry audio data, in response to the dry audio data and full reverberation metadata received at the at least one input from the server, where the dry audio data is indicative of dry input audio forwarded by the server, and the full reverberation metadata is indicative of a full reverberation filter.

34. The client of claim 33, wherein the full reverberation metadata includes reverberation data indicative of a reverberation decay profile of the full reverberation filter.

35. The client of claim 33, wherein the full reverberation metadata includes reverberation data indicative of an index to a table storing a reverberation decay profile of the full reverberation filter.

36. The client of claim 33, wherein the client is operable in a first mode in response to receiving first control data and in a second mode in response to receiving second control data, wherein during the first mode the processing subsystem reconstructs the dry audio, generates the late reverberant audio, and generates the wet output audio in response to early reverberant audio data and metadata received at the at least one input, and during the second mode the processing subsystem generates reverberant audio data by applying a full reverberation filter to audio data received at the at least one input in response to full reverberation metadata received at the at least one input.

\* \* \* \* \*